United States Patent
Jenninger et al.

(10) Patent No.: US 7,518,778 B2
(45) Date of Patent: Apr. 14, 2009

(54) ELECTROCHROMIC ARRANGEMENT

(75) Inventors: Werner Jenninger, Köln (DE);
Burkhard Köhler, Zierenberg (DE);
Joachim Wagner, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 60 days.

(21) Appl. No.: 11/852,666

(22) Filed: Sep. 10, 2007

(65) Prior Publication Data

US 2008/0070062 A1 Mar. 20, 2008

(30) Foreign Application Priority Data

Sep. 20, 2006 (DE) .................. 10 2006 044 069

(51) Int. Cl.
*G02F 1/153* (2006.01)
(52) U.S. Cl. ...................... 359/273; 359/265
(58) Field of Classification Search .......... 359/265, 359/273

See application file for complete search history.

(56) References Cited

U.S. PATENT DOCUMENTS

2004/0061919 A1 * 4/2004 Tench et al. ............. 359/265

FOREIGN PATENT DOCUMENTS

| EP | 0 440 957 A | 8/1991 |
|----|-------------|--------|
| EP | 0492387 A2 | 7/1992 |
| EP | 942 061 A1 | 9/1999 |
| EP | 1376620 A1 | 1/2004 |
| WO | 00 08523 A1 | 2/2000 |
| WO | 0008523 A2 | 2/2000 |
| WO | 03074627 A2 | 9/2003 |
| WO | 2006094052 A2 | 9/2006 |

* cited by examiner

*Primary Examiner*—Joseph Martinez
(74) *Attorney, Agent, or Firm*—Norris McLaughlin & Marcus PA

(57) ABSTRACT

Electrochromic arrangement containing an anionic polyelectrolyte that has been neutralized with lithium and can be applied from aqueous solution.

11 Claims, 1 Drawing Sheet

ELECTROCHROMIC ARRANGEMENT

The invention relates to an electrochromic arrangement containing an anionic polyelectrolyte that has been neutralized with lithium and can be applied from aqueous solution, in contrast to known electrochromic arrangements based on polymer electrolytes, which consist of a polymer matrix, a lithium conducting salt and optionally an aprotic solvent.

BACKGROUND OF THE INVENTION

EP 942 061 A1 describes an electrochromic arrangement having a polymer electrolyte formed of a mixture of lithium conducting salts and preferably crosslinked polymers and aprotic solvents. It is mentioned therein that, when plastic substrates are used, it is desirable to provide a barrier layer to water in order to ensure reliable operation. A disadvantage is the multi-step nature of the application and the presence of counterions (chlorate, triflate, etc.), which is undesirable in particular applications.

WO 00/08523 A1 describes electrochromic arrangements in which the electrolyte layer is used as an adhesive layer. However, even this polymer electrolyte, consisting of lithium conducting salt, aprotic solvent and a crosslinked polymer matrix, cannot be applied from aqueous solution.

There is therefore a need for a simplified process for the production of electrochromic arrangements. There is also a need for a process that does not require the lithium conducting salts of the known electrochromic arrangements, as they are difficult to obtain commercially and, on account of their counterions (chlorate, hexafluorophosphate, triflate), are not ecologically harmless.

Furthermore, components that could be applied from water would be desirable for reasons of hygiene in the workplace, but this is impossible with the electrochromic arrangements known hitherto.

It would therefore be desirable to find an electrolyte that could be applied from water, that yields a stable electrochromic arrangement and that does not require separate lithium conducting salts.

SUMMARY OF THE INVENTION

Surprisingly, it has now been found that uncrosslinked polyelectrolytes formed of non-functional, oligoether-containing and anionic repeating units can be applied from water and thereby permit the production of stable electrochromic arrangements.

DETAILED DESCRIPTION

Figure 1:
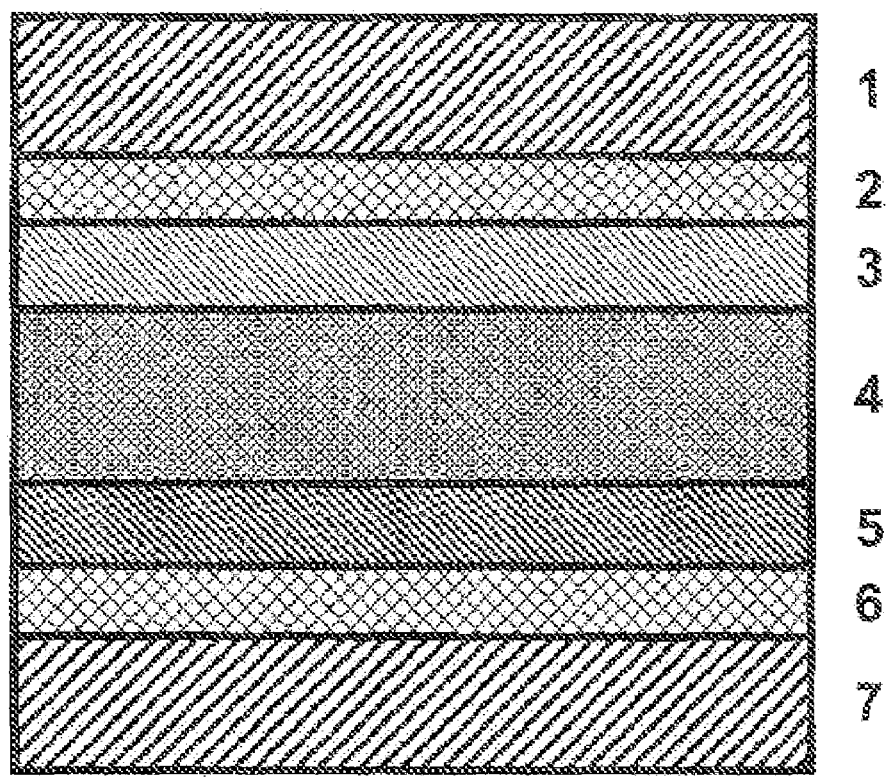
FIG. 1 illustrates an electrochromic arrangement according to the invention, having a transparent covering substrate (1), a first electrode arrangement (2), an electrochromic layer (3), a gel electrolyte layer (4), an ion storage layer (5), a second electrode arrangement (6) and a further substrate (7).

The invention accordingly provides a multi-layer electrochromic arrangement comprising at least a transparent covering substrate, a first electrode arrangement, a layer adjacent thereto containing electrochromic material, a gel electrolyte layer adjacent thereto, an ion storage layer adjacent to the gel electrolyte layer, a second electrode arrangement adjacent to the ion storage layer, and a further substrate that is transparent and/or provided with a mirrored surface, characterised in that the gel electrolyte layer contains one or more copolymers based on vinyl monomers, with the following repeating units:

A) from 10 to 80 wt. % of a non-functional repeating unit selected from the group consisting of:

wherein $R^1$, $R^2$, $R^4$, $R^5$ independently of one another represent hydrogen or methyl, and
$R^3$ represents $C_1$- to $C_{18}$-alkyl or $C_1$- to $C_4$-hydroxyalkyl,
$R^6$ represents hydrogen or $C_1$- to $C_{16}$-alkyl,
$R^7$ represents hydrogen or $C_1$- to $C_4$-alkyl,
$R^8$ represents $C_1$- to $C_{18}$-alkyl,
$R^9$ represents $C_1$- to $C_4$-alkyl,
in particular those of formula (I), particularly preferably wherein $R^1$=hydrogen, and
B) from 15 to 80 wt. % of an oligoether-containing repeating unit (VIII):

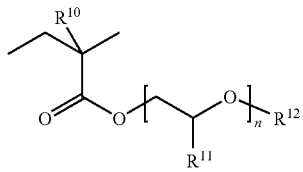
(VIII)

wherein
$R^{10}$ represents hydrogen or methyl,
$R^{11}$ represents hydrogen or methyl, preferably hydrogen, and
$R^{12}$ represents $C_1$- to $C_{18}$-alkyl, $C_7$- to $C_{30}$-aralkyl,
and n represents a natural number from 5 to 30, and C) from 5 to 50 wt. % of an anionic repeating unit neutralized completely or partially, in particular to the extent of at least 50%, with lithium, selected from the group consisting of:

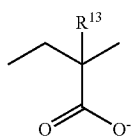
(IX)

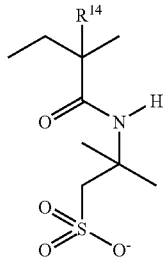
(X)

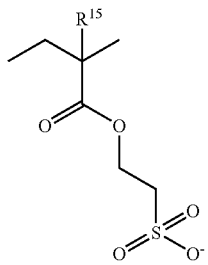
(XI)

wherein
$R^{13}$, $R^{14}$, $R^{15}$ independently of one another represent hydrogen or methyl, preferably those of formula (X). especially wherein $R^{14}$=hydrogen, or A) from 10 to 50 wt. % of a non-functional repeating unit A) having the meanings indicated above for $R^1$ to $R^9$ and D) from 50 to 90 wt. % of an oligoether-containing repeating unit of formula (XII) neutralized completely or partially, in particular to the extent of at least 50%, with lithium:

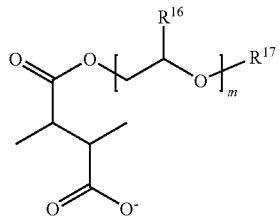
(XII)

wherein
$R^{16}$ represents hydrogen or methyl, in particular hydrogen,
$R^{17}$ represents a $C_1$-$C_4$-alkyl radical, preferably methyl, and wherein
m represents a natural number from 5 to 30.

The electrode arrangement and the electrochromic layer are preferably formed by a single material.

Preference is given also to a novel electrochromic arrangement wherein the electrode arrangements, independently of one another, are formed of optically transparent electrode material, especially of indium-tin oxide or transparent, electrically conducting polymers.

The electrode material of the electrode arrangements is based particularly preferably on transparent, electrically conducting polymers selected from the group consisting of polyaniline, polythiophene and polypyrrole, preferably polythiophene, particularly preferably based on polyethylenedioxythiophene.

As the non-functional repeating unit A) there is preferably used a repeating unit of formula (I):

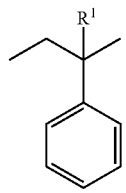
(I)

wherein $R^1$ represents hydrogen.

As the repeating unit C) there is preferably used a repeating unit of formula (X):

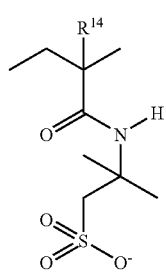
(X)

wherein $R^{14}$ represents hydrogen.

The molar mass Mn of the polyelectrolytes is preferably from 500 to 500,000 g/mol (number average), preferably from 1000 to 10,000 g/mol. The polyelectrolyte layer can contain up to 1 wt. % water. The polyelectrolyte layer has in particular a layer thickness of from 5 to 200 μm, particularly preferably from 10 to 100 μm.

The production of the polyelectrolytes can be carried out, for example, by copolymerizing maleic anhydride with styrene or other olefins or vinyl ethers or vinyl esters in a molar ratio of from 1:1 to 1:4 in a solvent, preferably an aprotic solvent, that is miscible with water in any ratio and that most particularly preferably has a boiling point below 100° C., such as acetone or tetrahydrofuran (THF), or by dissolving a maleic anydride copolymer, which has been prepared separately, in such a solvent, then adding an equimolar amount, relative to the amount of maleic anhydride, of a mono-OH-functional polyalkylene oxide, preferably polyethylene oxide, neutralizing the carboxyl group formed during the semi-ester formation with lithium hydroxide in particular to the extent of at least 50%, preferably from 80 to 100%, then adding water and removing the solvent, if its boiling point is below 100° C., by distillation.

Maleic anhydride-styrene copolymers dissolved in acetone or THF are preferably used in this reaction. The semi-ester formation takes place preferably at from 20 to 100° C.

The novel polyelectrolytes can also be produced by polymerizing as component A) (meth)acrylic acid alkyl ester, styrene, (meth)acrylonitrile or (meth)acrylamides, as component C) acrylic acid, methacrylic acid, acrylamido-methyl-propanesulfonic acid or (meth)acrylic acid sulfoethyl ester or the lithium salts thereof, and as component B) polyethylene oxide monomethyl ether (meth)acrylates having molar masses Mn of from 200 to 1000 g/mol, in a solvent that is miscible with water in any ratio and that can also be protic and that preferably has a boiling point below 100° C., such as methanol, ethanol, isopropanol, acetone or THF, adding water and, if necessary for the neutralization of the acidic components C), lithium hydroxide, and removing the solvent, if its boiling point is below 100° C., by distillation. Azo compounds or peroxides are used as initiators for the polymerisation. The polymerisation preferably takes place at a temperature of from 50 to 150° C.

Compounds that are preferably to be used for the ion storage layer are any ion storage compounds that are suitable in principle, in particular those from the group of formulae (XIII) to (XVIII)

$$Me^1O_2 \quad (XIII),$$

$$Me^2{}_2O_5 \quad (XIV),$$

$$Li_xMe^1O_2 \quad (XV),$$

$$Li_xMe^2{}_2O_5 \quad (XVI),$$

$$Li_xMe^1O_{2+x/2} \quad (XVII),$$

$$Li_xMe^2{}_2O_{5+x/2} \quad (XVIII),$$

wherein $Me^1$ and $Me^2$ represent a metal of sub-group III, IV and V of the periodic system of the elements, x represents a number from 0.001 to 5.

$Me^1$ preferably represents zirconium, cerium or titanium.

$Me^2$ preferably represents niobium.

The following compounds are most particularly preferably used for the ion storage layers: $CeO_2$, $Li_xCeO_2$, $Li_xCeO_{2+x/2}$, in particular $CeO_2$.

The ion reservoir can also be a mixture of at least two of the compounds of formulae (XIII) to (XVIII), wherein $Me^2$ in the mixture preferably represents vanadium or niobium.

The following compounds are most particularly preferably used for ion storage layers:

$V_2O_5$, $Li_x V_2O_5$, $Li_x V_2O_{5+x/2}$, $CeO_2$, $Li_x CeO_2$, $Li_x CeO_{2+x/2}$, $Nb_2O_5$, $Li_x Nb_2O_5$, $Li_x Nb_2O_{5+x/2}$, $TiO_2$—$CeO_2$, $CeO_2$—$V_2O_5$, $TiO_2$—$V_2O_5$, $Li_xCeO_2$—$Li_xV_2O_5$, $Li_xTiO_2$—$Li_xV_2O_5$.

The ion reservoir in the novel electrochromic arrangement accordingly is formed of a metal oxide compound or a mixture of metal oxides. The ion storage layers can already contain a Li salt when they are produced, or alternatively they can subsequently be loaded with Li ions electrochemically.

The compounds of formulae (XIII) to (XVIII) are generally known compounds and can be prepared according to generally known methods of inorganic chemistry (see e.g. Hollemann-Wiberg, Lehrbuch der organischen Chemie, 71st-80th Edition, Walter de Gruyter & Co., Berlin 1971, pages 779-781, Rompp Chemie Lexikon; Chemical Abstract 1313-96-8).

The electrochromic arrangement according to the invention therefore contains at least one inorganic ion storage layer.

This can be applied either by a sol-gel process or by vapor deposition/sputtering to an electrically conductive substrate which can be provided with a metal grid in order to improve the conductivity. It can also be applied in the form of nano particles, which can be applied by means of a pouring technique.

The following substances can be used individually as electrochromic material within the scope of the invention: $WO_3$, $MoO_3$, polyanilines, polypyrroles or, in a preferred embodiment, polythiophenes, wherein the polypyrroles and polythiophenes are preferably substituted in the 3,4-position by alkyl groups or alkoxy groups and the substituents can be members of a 6- or 7- or 8-membered ring fused to the heterocyclic compound, it being possible for that ring to contain two oxygen atoms, which are preferably located on the heterocyclic compound.

Particularly preferred electrochromic materials are polydioxythiophenes. The polydioxythiophenes are preferably cationically charged and composed of structural units of formula (XIX)

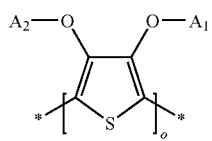

(XIX)

in which $A_1$ and $A_2$ independently of one another represent optionally substituted $(C_1-C_4)$-alkyl or together form optionally substituted $(C_1-C_4)$-alkylene, and o represents an integer from 2 to 10,000, preferably from 5 to 5000, and preferably contain polyanions as counterions.

Preferred cationic polydioxythiophenes are composed of structural units of formula (XX) or (XXI)

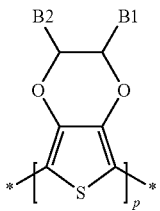

(XX)

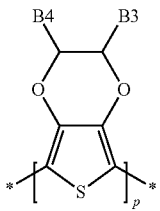

(XXI)

wherein

B1 and B2 independently of one another represent hydrogen, optionally halogen substituted ($C_1$-$C_{18}$)-alkyl, preferably ($C_1$-$C_{10}$)-alkyl, especially ($C_1$-$C_6$)-alkyl, ($C_2$-$C_{12}$)-alkenyl, preferably ($C_2$-$C_8$)-alkenyl, ($C_3$-$C_7$)-cycloalkyl, preferably cyclopentyl, cyclohexyl, ($C_7$-$C_{15}$)-aralkyl, preferably phenyl-($C_1$-$C_4$)-alkyl, ($C_6$-$C_{10}$)-aryl, preferably phenyl, naphthyl, ($C_1$-$C_{18}$)-alkyloxy, preferably ($C_1$-$C_{10}$)-alkyloxy, for example methoxy, ethoxy, n- or iso-propoxy, or ($C_2$-$C_{18}$)-alkyloxy esters and B3 and B4 independently of one another represent hydrogen, but not both simultaneously, ($C_1$-$C_{18}$)-alkyl, preferably ($C_1$-$C_{10}$)-alkyl, especially ($C_1$-$C_6$)-alkyl, substituted by at least one sulfonate group, ($C_2$-$C_{22}$)-alkenyl, preferably ($C_2$-$C_8$)-alkenyl, ($C_3$-$C_7$)-cycloalkyl, preferably cyclopentyl, cyclohexyl, ($C_7$-$C_{15}$)-aralkyl, preferably phenyl-($C_1$-$C_4$)-alkyl, ($C_6$-$C_{10}$)-aryl, preferably phenyl, naphthyl, ($C_1$-$C_{18}$)-alkyloxy, preferably ($C_1$-$C_{10}$)-alkyloxy, for example methoxy, ethoxy, n- or iso-propoxy, or ($C_2$-$C_{18}$)-alkyloxy esters, and p represents a number from 2 to 10,000, preferably from 5 to 5000.

Most particularly preferably, the electrochromic arrangement according to the invention contains at least one electrically conductive, electrochromic, cationic or neutral polydioxythiophene of formulae (XXII) and/or (XXIII) wherein B3 has the meaning given above and p represents an integer from 2 to 10,000, preferably from 5 to 5000.

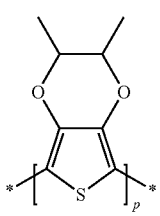

(XXII)

-continued

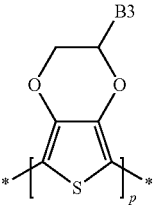

(XXIII)

As polyanions there are used especially the anions of polymeric carboxylic acids, such as polyacrylic acids, polymethacrylic acids, or polymaleic acids and polymeric sulfonic acids, such as polystyrenesulfonic acids and polyvinylsulfonic acids. These polycarboxylic and polysulfonic acids can also be copolymers of vinylcarboxylic and vinylsulfonic acids with other polymerizable monomers, such as acrylic acid esters and styrene. Particular preference is given to the anion of polystyrenesulfonic acid as counterion. The molecular weight Mn of the polyacids that yield the polyanions is preferably from 1000 to 2,000,000, particularly preferably from 2000 to 500,000. The polyacids or their alkali salts are commercially available, for example polystyrenesulfonic acids and polyacrylic acids, or alternatively can be prepared according to known processes (see e.g. Houben Weyl, Methoden der organischen Chemie, Vol. E 20 Makromolekulare Stoffe, Part 2, (1987), p. 1141 ff). Instead of the free polyacids required for the formation of the dispersions of polydioxythiophenes and polyanions, it is also possible to use mixtures of alkali salts of the polyacids and corresponding amounts of monoacids.

In a particularly preferred variant of the electrochromic arrangement, the electrode arrangement and the layer containing electrochromic material adjacent thereto are formed together by a combination of polyethylenedioxythiophene and polystyrenesulfonic acid.

In the case of formula (XXIII), the polydioxythiophenes carry positive and negative charge in the structural unit. The preparation of polydioxythiophenes is described in principle, for example, in EP-A 0 440 957 (=US-A 300 575).

The polydioxythiophenes are obtained by oxidative polymerization. As a result, they acquire positive charges, which are not shown in the formulae because their number and their position cannot be determined exactly without difficulty.

It is also possible to use the corresponding polypyrroles, in which S is replaced by NH. As a bridge between the two oxygen substituents in the 3,4-position, the neopentyl radical or the butylene radical can also be used. These radicals can also bridge the oxygen atoms of the 3,4-substituted polythiophenes.

As material for the substrates there can be used in particular glasses or transparent plastics materials, such as polycarbonate, polyethylene terephthalate or polymethylmethacrylate (PMMA).

Contacting of the redox-active substance and the lithium ion conductor can be effected by a conductive, transparent layer located between the substrate and the functional layer, such as indium-tin oxide (ITO), $SnO_2$, fluorine-doped SnO, transparent conductive polymer, in particular polyethylenedioxythiophene/polystyrene sulfonic acid (PEDOT/PSS), vapor-deposited silver or metal gratings. It is, however, also possible for a functional layer, for example the redox-active substance polyethylenedioxythiophene, also to assume the function of the conductive, transparent layer.

Joining of the side with the redox-active substance and the side with the lithium ion reservoir is carried out, for example, by coating one or both sides on the functional layer with a water-containing solution of the polyelectrolyte by spraying, knife application, spread coating or immersion and then, optionally after exposure to air, joining the two sides with the functional layer in the direction of the polymer electrolyte located in the middle, so that an electrochromic arrangement substrate-(conductive, transparent layer)-redox-active substance-polyelectrolyte-lithium ion reservoir-(conductive, transparent layer)-substrate is obtained, the constituents in brackets being optional.

The film composite is preferably improved by lamination at temperatures of from 70 to 170° C. Air inclusions can also be avoided in that manner.

The PEDOT/PSS layer can contain as processing aids solvents, water-soluble polymers or non-ionic or anionic emulsifiers, such as dimethyl sulfoxide (DMSO), N-Methylpyrrolidone (NMP), dimethylacetamide, dimethylformamide, polyvinyl alcohols (completely or partially saponified polyvinyl acetate or polyethylene-co-vinyl acetate), polyesters of sulfoisophthalic acid, ethoxylation products of acetylenebiscarbinols, fatty alcohols, fatty amines, fatty amides or alkylphenols, $C_{12}$-$C_{18}$ fatty acid esters of sorbitan or ethoxylated sorbitan, polyethylene oxide-silicon block or graft copolymers or sulfonated or sulfated alkyl aromatic compounds or fatty alcohols.

The polyelectrolyte layer can contain as processing aids solvents or non-ionic or anionic emulsifiers, such as DMSO, NMP, dimethylacetamide, dimethylformamide, ethoxylation products of acetylenebiscarbinols, fatty alcohols, fatty amines, fatty amides or alkylphenols, $C_{12}$-$C_{18}$ fatty acid esters of sorbitan or ethoxylated sorbitan, polyethylene oxide-silicon block or graft copolymers or sulfonated or sulfated alkyl aromatic compounds or fatty alcohols.

Contacting is generally carried out on both conductive layers, a direct voltage of from 0.5 to 20 V, preferably from 2 to 7 V, being applied.

The electrochromic arrangements according to the invention can be used in vehicle glazing, glazing for buildings, display elements (displays, e.g. for mobile telephones), optical systems (e.g. light switches in cameras), switchable mirrors (e.g. rear-view mirrors for motor vehicles).

EXAMPLES

Example 1

Production of a Polyelectrolyte:

234 g of a cumyl-terminated maleic anhydride-styrene copolymer having a molar mass of Mn=1900 and a styrene content of 75% are introduced into 500 g of acetone; a mixture of 273 g of polyethylene glycol monomethyl ether having a molar mass Mn=550, 0.1 g of methylene-bis-tert.-butylmethylphenyl as antioxidant, 12 g of lithium hydroxide and 100 g of acetone is added dropwise thereto at 20° C. in the course of one hour. After 16 hours, 500 g of water are added and the acetone is removed by distillation at 80° C. An aqueous solution of the polyelectrolyte is obtained.

Example 2

Production of Polyelectrolyte:

1000 g of acetone, 233 g of a cumyl-terminated maleic anhydride copolymer having a molar mass of Mn=1600 and a styrene content of 57%, and 550 g of polyethylene glycol monomethyl ether having a molar mass Mn=550 are introduced into a reaction vessel, 18 g of lithium hydroxide are added thereto, and stirring is carried out for 36 hours. Then 800 g of water are added and the acetone is removed by distillation at 80° C. An aqueous solution of the polyelectrolyte is obtained.

Example 3

Production of a Polyelectrolyte:

A mixture of 20 g of acrylamidomethylpropanesulfonic acid, 50 g of methyl acrylate, 50 g of hydroxyethyl methacrylate, 80 g of polyethylene glycol monomethyl ether methacrylate having a molar mass Mn=475, 2 g of thioglycolic acid as regulator, 1 g of azobisisobutyronitrile as initiator, 18 g of water and 200 g of methanol is added dropwise, within a period of 2 hours, to a flask heated to 80° C., and stirring is carried out for 16 hours at 80° C. Then 2 g of lithium hydroxide and 200 ml of water are added and the methanol is removed by distillation at 80° C. An aqueous solution of the polyelectrolyte is obtained.

Example 4

Production of a Substrate having a Lithium Ion Storage Layer:

First a layer of indium-tin oxide (ITO) and then a layer of cerium dioxide are applied to a polycarbonate film by vapor deposition under a high vacuum (forms the lithium ion storage layer).

Example 5

Production of a Substrate having Polyethylenedioxythiophene as Redox-Active Substance:

72.4 g of Baytron® PAG (aqueous dispersion of the conductive polymer PEDOT/PSS (polyethylenedioxythiophene/polystyrene sulfonate), manufacturer H.C. Starck GmbH), 4.3 g of DMSO, 10.8 g of a 10% solution of polyvinyl alcohol and 0.2 g of Surfynol 104 E (ethoxylated bis(methylisobutylcarbinol)acetylene, manufacturer: Air Products) are mixed. A 12µ thick film is applied to the electrically conductive side of a polycarbonate film (Makrofol, manufacturer Bayer MaterialScience AG) to which ITO has been applied by vapor deposition, and drying is carried out for one hour at 20° C. and for 3 minutes at 130° C.

A transparent polymer film that is only very slightly bluish in color is obtained.

Example 6

Production of an Electrochromic Arrangement:

A 24µ thick layer of a mixture of 36 parts of polyelectrolyte according to Example 1), 2.15 parts of DMSO and 0.1 part of Surfynol 104 E (Tertiary acetylenic glycol in ethylene glycol, a wetting agent available from Airco) is applied to the ion storage layer of the substrate according to Example 4); the whole is exposed to air for one hour at 20° C. and then dried for 3 minutes at 90° C. The film so provided with polyelectrolyte and the substrate with redox-active substance according to Example 5) are joined together in such a manner that the polyelectrolyte and the Baytron® are next to one another. Lamination is then carried out at 150° C.

Example 7

Production of an Electrochromic Arrangement:

The procedure of Example 6) is followed, the product from Example 2) being used as the polyelectrolyte.

Testing of the arrangements 6 and 7 is carried out by applying a voltage of 5 V and reversing the poles. Reversal of the poles is repeated 30 times:

TABLE 1

| Example | Time to saturation of the blue coloration | Discoloration time | Cycle stability |
|---------|-------------------------------------------|--------------------|-----------------|
| 6       | 4 s                                       | 2 s                | >30             |
| 7       | 2 s                                       | 1 s                | >30             |

The test results of Examples 6 and 7 demonstrate the stability of the electrochromic arrangements according to the invention.

The invention claimed is:

1. Multi-layer electrochromic arrangement comprising at least a transparent covering substrate (1), a first electrode arrangement (2), a layer (3) adjacent thereto containing electrochromic material, a gel electrolyte layer (4) adjacent thereto, an ion storage layer (5) adjacent to layer (4), a second electrode arrangement (6) adjacent to layer (5), and a further substrate (7) that is transparent and/or provided with a mirrored surface, characterised in that the gel electrolyte layer contains one or more copolymers having the following repeating units:

A) from 10 to 80 wt. % of a non-functional repeating unit selected from the group consisting of:

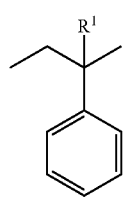
(I)

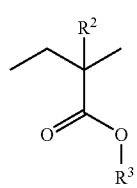
(II)

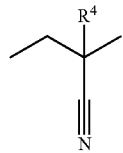
(III)

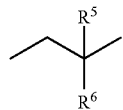
(IV)

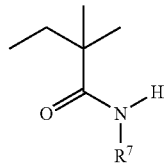
(V)

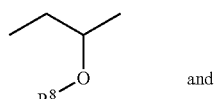
and
(VI)

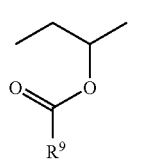
(VII)

wherein $R^1$, $R^2$, $R^4$, $R^5$ independently of one another represent hydrogen or methyl, and $R^3$ represents $C_1$- to $C_{18}$-alkyl or $C_1$- to $C_4$-hydroxyalkyl, $R^6$ represents hydrogen or $C_1$- to $C_{16}$-alkyl, $R^7$ represents hydrogen or $C_1$- to $C_4$-alkyl, optionally branched, $R^8$ represents $C_1$- to $C_{18}$-alkyl, $R^9$ represents $C_1$- to $C_4$-alkyl, and B) from 15 to 80 wt. % of an oligoether-containing repeating unit (VIII):

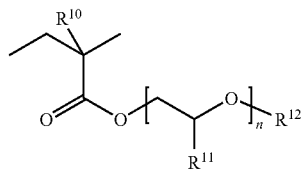
(VIII)

wherein $R^{10}$ represents hydrogen or methyl, $R^{11}$ represents hydrogen or methyl, preferably hydrogen, and $R^{12}$ represents $C_1$- to $C_{18}$-alkyl, $C_7$- to $C_{30}$-aralkyl, and n represents a natural number from 5 to 30, and C) from 5 to 50 wt. % of an anionic repeating unit neutralized completely or partially, in particular to the extent of at least 50%, with lithium, selected from the group:

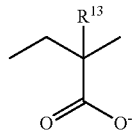
(IX)

-continued

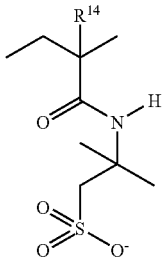
(X)

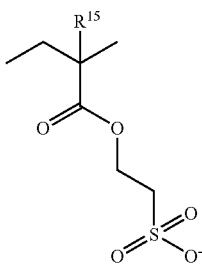
(XI)

wherein
$R^{13}$, $R^{14}$, $R^{15}$ independently of one another represent hydrogen or methyl,
in particular those of formula (X) wherein in particular $R^{14}$=hydrogen,
or
A) from 10 to 50 wt. % of a non-functional repeating unit A) having the meanings indicated above for $R^1$ to $R^9$
and
D) from 50 to 90 wt. % of an oligoether-containing repeating unit of formula (XII) neutralized completely or partially, in particular to the extent of at least 50%, with lithium:

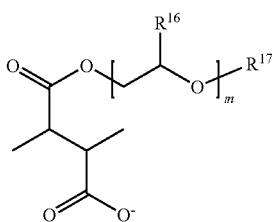
(XII)

wherein
$R^{16}$ represents hydrogen or methyl, in particular hydrogen,
$R^{17}$ represents a $C_1$-$C_4$-alkyl radical, preferably methyl,
and wherein m represents a natural number from 5 to 30.

2. The multi-layer electrochromic arrangement according to claim 1, wherein said non-functional repeating unit is a repeating unit of formula (I) and said anionic repeating unit is a repeating unit of formula (X).

3. The multi-layer electrochromic arrangement according to claim 1, wherein said anionic repeating unit and said oligoether-containing repeating units are neutralized to the extent of at least 50% with lithium.

4. The multi-layer electrochromic arrangement according to claim 2, wherein
$R^1$=hydrogen,
$R^{11}$=hydrogen,
$R^{14}$=hydrogen,
$R^{16}$=hydrogen, and
$R^{17}$=methyl.

5. The multi-layer electrochromic arrangement according to claim 1, wherein the first electrode arrangement and the layer containing electrochromic material are formed by a single material.

6. The multi-layer electrochromic arrangement according to claim 1 or 5, wherein the first and second electrode arrangement are formed, independently of one another, of optically transparent electrode material selected from the group consisting of indium-tin oxide and transparent, electrically conducting polymers.

7. The multi-layer electrochromic arrangement according to claim 6, wherein the electrode material of the first electrode arrangement and/or of the second electrode arrangement is based on transparent, electrically conducting polymers selected from the group consisting of polyaniline, polythiophene and polypyrrole, in particular polythiophene, particularly preferably on polyethylenedioxythiophene.

8. The multi-layer electrochromic arrangement according to claim 1 or 5, wherein the non-functional repeating unit A) is a repeating unit of formula (I):

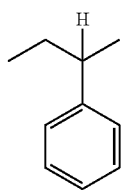
(I)

9. The multi-layer electrochromic arrangement according to claim 1 or 5, wherein the repeating unit C) is a repeating unit of formula (X):

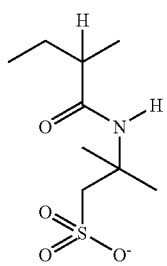
(X)

10. The multi-layer electrochromic arrangement according to claim 1 or 2, wherein the first electrode arrangement and the layer containing electrochromic material (3) are formed together by a layer of a combination of polyethylenedioxythiophene and polystyrenesulfonic acid.

11. Vehicle glazing, glazing for buildings, display elements for mobile telephones, light switches in cameras, rear-view mirrors for motor vehicles comprising the multi-layer electrochromic arrangement of claim 1.

* * * * *